(12) United States Patent
Kim et al.

(10) Patent No.: US 8,400,532 B2
(45) Date of Patent: Mar. 19, 2013

(54) DIGITAL IMAGE CAPTURING DEVICE PROVIDING PHOTOGRAPHING COMPOSITION AND METHOD THEREOF

(75) Inventors: Jong-sun Kim, Suwon-si (KR); Seung-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 12/879,190

(22) Filed: Sep. 10, 2010

(65) Prior Publication Data
US 2011/0187882 A1 Aug. 4, 2011

(30) Foreign Application Priority Data

Feb. 1, 2010 (KR) ........................ 10-2010-0009152

(51) Int. Cl.
*H04N 5/225* (2006.01)
(52) U.S. Cl. .................................... 348/239; 348/207.99
(58) Field of Classification Search ............. 348/207.99, 348/239
See application file for complete search history.

(56) References Cited

U.S. PATENT DOCUMENTS

| 2006/0158522 A1* | 7/2006 | Pryor ........................ 348/207.99 |
| 2008/0143854 A1* | 6/2008 | Steinberg et al. ............. 348/239 |
| 2012/0189160 A1* | 7/2012 | Kaneda et al. ................ 382/103 |
| 2012/0242865 A1* | 9/2012 | Vartanian et al. ............. 348/239 |

* cited by examiner

*Primary Examiner* — Tuan Ho
(74) *Attorney, Agent, or Firm* — Drinker Biddle & Reath LLP (57) ABSTRACT

A digital image capturing device detecting a face in an input image and providing a photographing composition, and a method using the digital image capturing device are provided. An embodiment of the digital image capturing device includes: a face detecting unit for detecting a face in the input image; an extracting unit for extracting tilt information of the detected face and a gaze direction; an establishing unit for establishing a photographing composition according to the tilt information or gaze direction of the face; and a providing unit for providing a change of the photographing composition according to the established photographing composition.

20 Claims, 10 Drawing Sheets

DIGITAL IMAGE CAPTURING DEVICE PROVIDING PHOTOGRAPHING COMPOSITION AND METHOD THEREOF

CROSS-REFERENCE TO RELATED PATENT APPLICATION

This application claims the benefit of Korean Patent Application No. 10-2010-0009152, filed on Feb. 1, 2010, in the Korean Intellectual Property Office, the disclosure of which is incorporated herein in its entirety by reference.

BACKGROUND

Various embodiments of the invention relate to a digital image capturing device detecting a face with respect to an input image and providing a photographing composition and a method using the digital image capturing device.

As digital image capturing devices, such as compact digital cameras, digital single-lens reflex (DSLR) cameras, or the like, have developed, various guide functions, which allow beginners to take photographs like a professional photographer, are increasing.

It is difficult for beginners to determine a proper photographing composition depending on a subject, and thus a digital image capturing device has to detect a subject and to provide a photographing composition appropriate for the subject. In particular, when the subject is a person, a photographer should consider tilt information of a face and a gaze direction in order to take a photograph like a professional photographer.

SUMMARY

An embodiment of the invention provides a digital image capturing device detecting a face and providing a photographing composition established using tilt information and a gaze direction of the detected face, and a method using the digital image capturing device.

According to an embodiment of the invention, there is provided a digital image capturing device including a screen on which an input image is displayed, the digital image capturing device includes: a face detecting unit for detecting a face with respect to the input image; an extracting unit for extracting tilt information of the detected face and a gaze direction; an establishing unit for establishing a photographing composition according to the tilt information or the gaze direction of the face; and a providing unit for providing a change of the photographing composition according to the established photographing composition.

The photographing composition is established in correspondence to the screen, and the screen is divided into first through fourth regions according to the rule of thirds. The face is located in one region from among the first through fourth regions.

The extracting unit includes: a gaze direction extracting unit for extracting the gaze direction of the face, and as a result of the extraction of the gaze direction, when it is determined that the face faces frontward, a tilt information extracting unit for detecting a tilt vector in the face and for extracting a coordinate of the tilt vector with respect to a coordinate plane corresponding to the face.

The tilt information extracting unit detects the tilt vector extending from a nose to a forehead, and extracts a coordinate of the tilt vector with respect to a coordinate plane in which a horizontal direction of the screen is an X axis and a direction perpendicular to the X axis is a Y axis.

When the gaze direction of the face is frontward, the establishing unit establishes a photographing composition according to the extracted tilt information.

When the coordinate of the tilt vector corresponds to a first quadrant of the coordinate plane, the establishing unit establishes a photographing composition such that the face is located in a first region of the screen; when the coordinate of the tilt vector corresponds to a second quadrant of the coordinate plane, the establishing unit establishes a photographing composition such that the face is located in a second region of the screen; when the coordinate of the tilt vector corresponds to a third quadrant of the coordinate plane, the establishing unit establishes a photographing composition such that the face is located in a third region of the screen; and when the coordinate of the tilt vector corresponds to a fourth quadrant of the coordinate plane, the establishing unit establishes a photographing composition such that the face is located in a fourth region of the screen.

When the gaze direction of the face is not frontward, the establishing unit establishes a photographing composition according to the extracted gaze direction.

The establishing unit establishes a photographing composition such that the face is located in one region from among the first through fourth regions of the screen, and the one region is a region where the extracted gaze direction is toward the center of the screen.

The providing unit provides a change of the photographing composition by displaying a screen region corresponding to the established photographing composition or outputting a warning in the form of a text or voice message.

Another embodiment provides a digital image capturing device including a face detecting unit that detects a face in an image and an extracting unit that determines a gaze direction of the face and if the gaze direction is frontward, determines tilt information of the face. The embodiment further includes an establishing unit that determines a photographing composition based on the tilt information if the gaze direction is frontward and the gaze direction if the gaze direction is not frontward. In addition, the embodiment includes a providing unit that indicates where on a display of the digital image capturing device the face should be located based on the photographing composition.

According to another embodiment of the invention, there is provided a digital image capturing method including: detecting a face with respect to an input image; extracting tilt information and a gaze direction of the detected face; establishing a photographing composition according to the tilt information or the gaze direction of the face; providing a change of the photographing composition according to the established photographing composition.

The photographing composition is established in correspondence to the screen, and the screen is divided into first through fourth regions according to the rule of thirds. The face is located in one region from among the first through fourth regions.

The extracting of the tilt information and the gaze direction includes: as a result of the extraction of the gaze direction, when it is determined that the face faces frontward, extracting a tilt vector in the face and extracting a coordinate of the tilt vector with respect to a coordinate plane corresponding to the face.

The extracting of the tilt information and the gaze direction includes: detecting the tilt vector extending from a nose to a forehead, extracting a coordinate of the tilt vector with respect to a coordinate plane in which a horizontal direction of the screen is an X axis and a direction perpendicular to the X axis is a Y axis.

The establishing of the photographing composition includes, when the gaze direction of the face is frontward, establishing a photographing composition according to the extracted tilt information.

The establishing of the photographing composition includes: when the coordinate of the tilt vector corresponds to a first quadrant of the coordinate plane, establishing a photographing composition such that the face is located in a first region of the screen; when the coordinate of the tilt vector corresponds to a second quadrant of the coordinate plane, establishing a photographing composition such that the face is located in a second region of the screen; when the coordinate of the tilt vector corresponds to a third quadrant of the coordinate plane, establishing a photographing composition such that the face is located in a third region of the screen; and when the coordinate of the tilt vector corresponds to a fourth quadrant of the coordinate plane, establishing a photographing composition such that the face is located in a fourth region of the screen.

The establishing of the photographing composition includes, when the gaze direction of the face is not frontward, establishing a photographing composition according to the extracted gaze direction.

The establishing of the photographing composition includes establishing a photographing composition such that the face is located in one region from among the first through fourth regions of the screen, and the one region is a region where the extracted gaze direction is toward the center of the screen.

The providing of the photographing composition includes providing a change of the photographing composition by displaying a screen region corresponding to the established photographing composition or a warning in the form of a text or voice message.

BRIEF DESCRIPTION OF THE DRAWINGS

The above and other features and advantages of various embodiments of the invention will become more apparent by describing in detail exemplary embodiments thereof with reference to the attached drawings in which.

DETAILED DESCRIPTION OF THE EMBODIMENTS

Hereinafter, a digital image capturing device, a method of controlling the same, and a recording medium storing a program to execute the method will now be described more fully with reference to the accompanying drawings, in which exemplary embodiments of the invention are shown.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the exemplary embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more central processing units (CPUs) or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar references in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

Hereinafter, embodiments of the invention will be described in detail with reference to the attached drawings. A digital camera will be described as an example of a digital image capturing device. However, the digital image capturing device is not limited to the digital camera, and may another type of digital device, such as a mobile phone with a camera, a personal digital assistant (PDA), a portable multimedia player (PMP), or the like.

Figure 1:
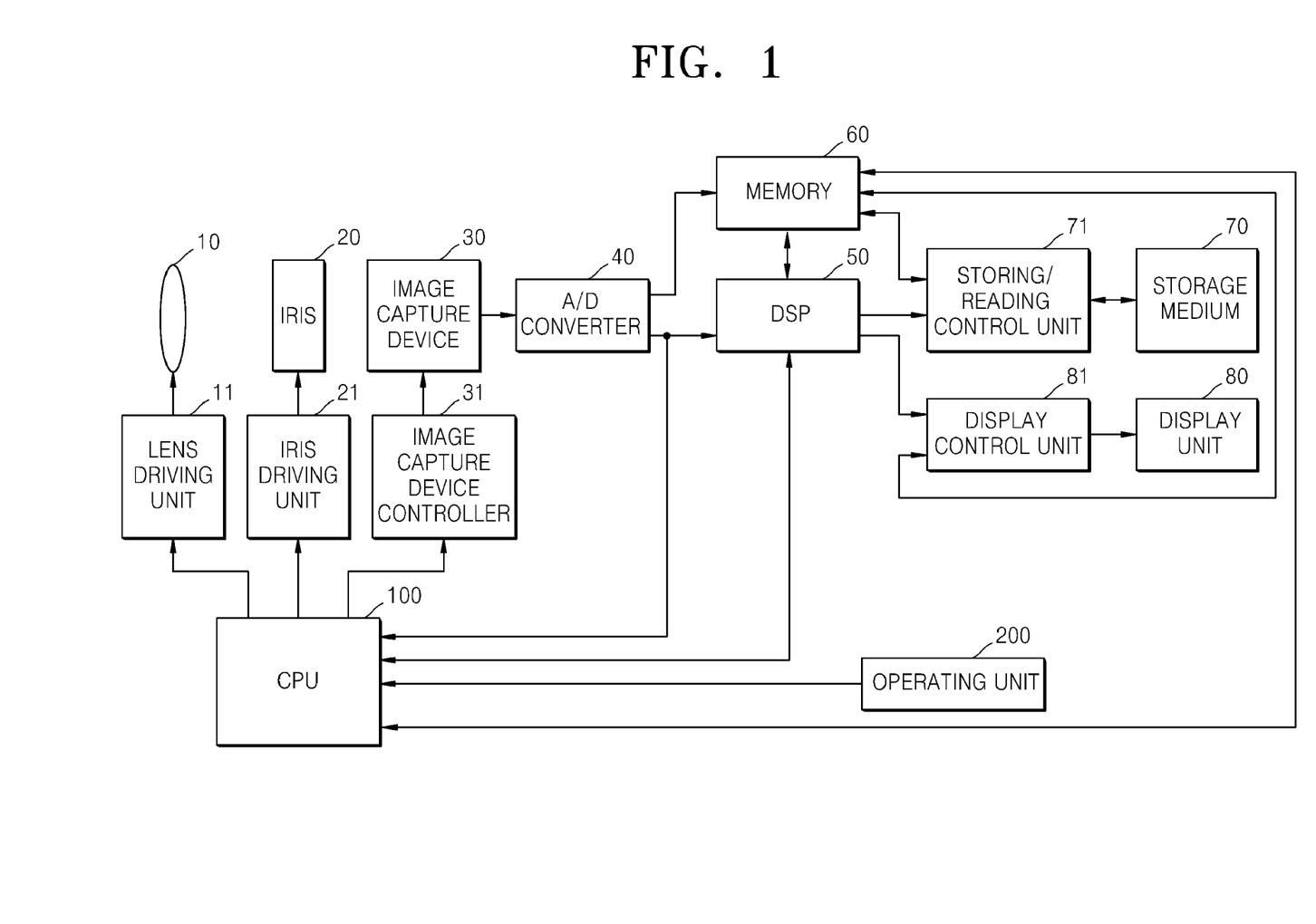
FIG. 1 is a block diagram illustrating a digital camera according to an embodiment of the invention.

FIG. 1 is a block diagram illustrating the digital camera according to an embodiment of the invention.

All operations of the digital image capturing device are controlled by a central processing unit (CPU) 100.

The digital image capturing device includes a key for generating an electrical signal in response to a user's instructions. For example, an operating unit 200 may be a button, a key, a touch panel, a touch screen, or a dial, and may input a user control signal such as power on/off, photographing start/stop, reproducing start/stop/search, driving of an optical system, mode operation, menu operation, and selective operation signals.

The electrical signal generated by the operating unit 200 is transmitted to the CPU 100 so that the CPU 100 can control the digital image capturing device in response to the electrical signal.

In a photographing mode, as an electrical signal generated in response to a user's instructions is applied to the CPU 100, the CPU 100 analyzes the electrical signal and controls a lens driving unit 11, an iris driving unit 21, and an image capture device controller 31, thus controlling the location of a lens 10, the degree of openness of an iris 20, and the sensitivity of an image capture device 30, respectively.

The image capture device 30 produces an image of a subject from received light. The image capture device 30 may be a complementary metal oxide semiconductor (CMOS) sensor array, a charge coupled device (CCD) sensor array, or the like.

An analog/digital (A/D) converter 40 converts analog data received from the image capture device 30 into digital data. The ADC 40 may be not included depending on the characteristics of the image capture device 30.

Image data output from the image capture device 30 is provided to a digital signal processor (DSP) 50 via a memory 60 or bypassing the memory 60. The image data output from the image capture device 30 may also be provided to the CPU 100 if necessary. In the present embodiment, the memory 60 may include a read-only memory (ROM) or a random access memory (RAM).

Also, the DSP 50 may reduce noise with respect to the input image data and may perform an image signal process such as gamma correction, color filter array interpolation, color matrix, color correction, and color enhancement. The DSP 50 may produce an image file by compressing the image data produced by performing an image signal process, or may restore image data from the image file. A compression format of an image may be a reversible or nonreversible format. As an example of the compression format, the image data can be converted into Join Photographing Experts Group (JPEG) format or JPEG 2000 format. Also, the DSP 50 may functionally perform indistinctness, color, blur, edge emphasis, image interpretation, image recognition, and image effect processes. A scene recognition process may be performed using the image recognition process.

The DSP 50 may also perform a display image signal process for displaying an image on a display unit. For example, the DSP 50 may perform brightness level adjustment, color correction, contrast adjustment, outline emphasis adjustment, a screen division, character image generation, and image composing processes.

The image data output from the DSP 50 may be transmitted to a display control unit 81 directly or via the memory 60. The display control unit 81 displays an image on a display unit 80 by controlling the display unit 80.

A liquid crystal display (LCD) device, an organic light emitting display (OLED) device, or an electrophoresis display (EDD) device may be used as the display unit 80.

In addition, the data output from the DSP 50 is input to a storage/read controller 71 directly or via the memory 60. The storage/read controller 71 stores data in a storage medium 70 automatically or according to a signal from the user. Alternatively, the storing/reading control unit 71 may read the image data stored in the storage medium 70, and provide the read data to the display control unit 81 via the memory 60 or via another path so that an image is displayed on the display unit 80.

The storage medium 70 may be attachable to and detachable from a digital image processor. Alternatively, the storage medium 70 may be permanently built in the digital image processor. The storage medium 70 may be a Secure Digital/CompactFlash/SmartMedia (SD/CF/SM) card, a hard disk drive (HDD), an optical disk, a magneto-optical disk or a hologram memory.

An operation of the DSP 50 will be described in detail with reference to FIG. 2.

Figure 2:
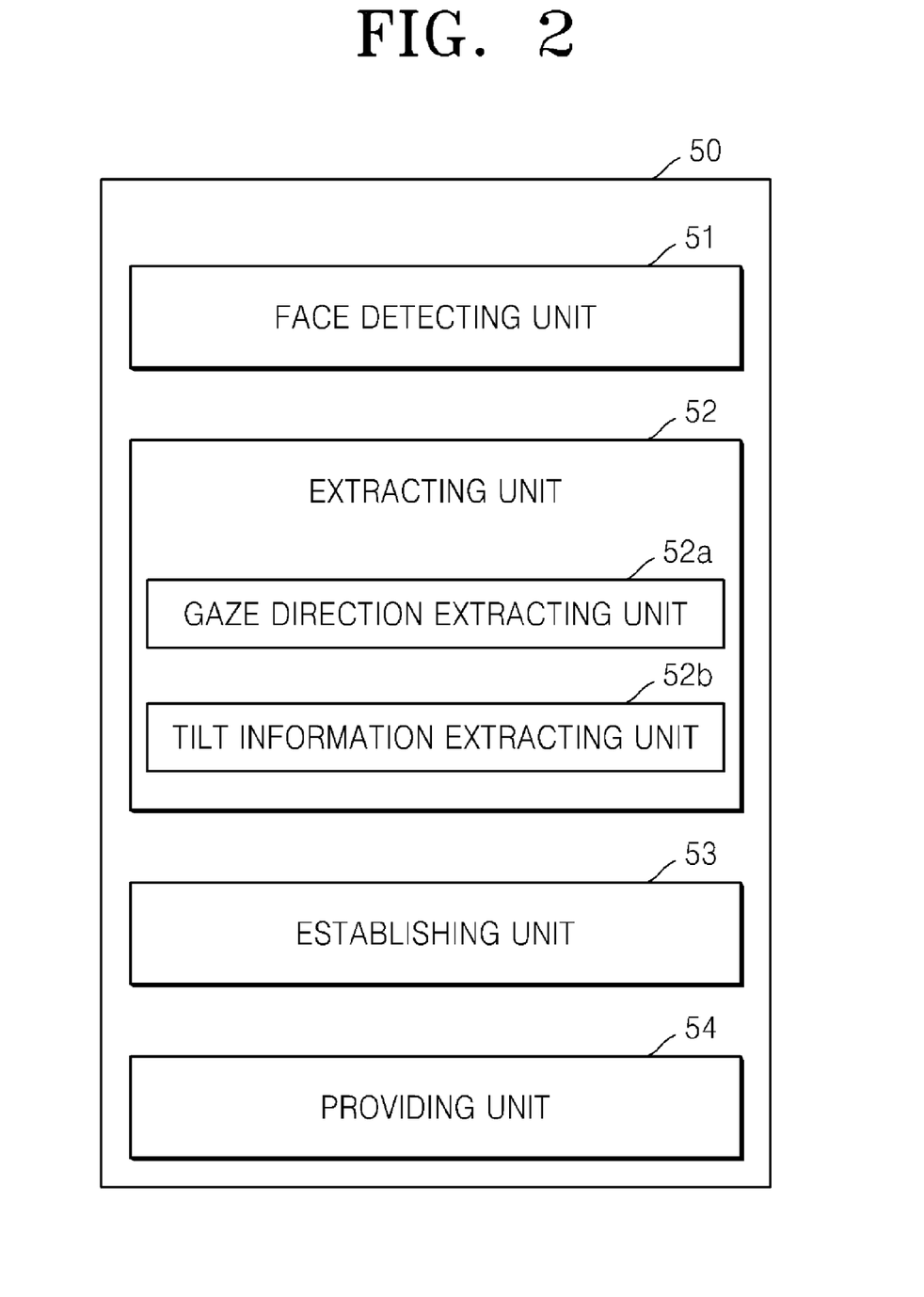
FIG. 2 is a block diagram illustrating a digital signal processor (DSP) of FIG. 1, according to an embodiment of the invention.

FIG. 2 is a block diagram illustrating the DSP 50 of FIG. 1, according to an embodiment of the invention.

Referring to FIG. 2, the DSP 50 may include a face detecting unit 51 for detecting a face, an extracting unit 52 for extracting tilt information and a gaze direction of the detected face, an establishing unit 53 for establishing a photographing composition according to a result of the extracting unit 52, and a providing unit 54 for providing the photographing composition established in the establishing unit 53 to a user.

The face detecting unit 51 detects a face with respect to an image that is input via the lens 10, the iris 20, the image capture device 30, and the ADC 40.

Unchanging features of the face, such as eyes, a nose, a mouth, a skin texture, and a skin color, are searched for using a face feature based detection method. In particular, the skin color, from among the features of the face, is less sensitive to movement, rotation and change of the size of the face, and thus the face feature based detection method is the most widely used method for detecting a face. In addition, a face template based detection method is another method for detecting a face. In the face template based detection method, several standard patterns for a face are formed, and then the patterns are stored to detect the face. Then, each of the patterns is compared with an image in a search window of the image to detect the face. In addition, a support vector machine (SVM) based method is another method that is recently widely used to detect a face. The SVM based method performs sub-sampling on different regions from an image, and then allows a learning device to learn about a face part and a non-face part in order to detect the face in the input image. The face information detected in the face detecting unit 51 is already well-known, and thus a detailed description thereof will be omitted here.

The extracting unit 52 analyzes the detected face and extracts tilt information and a gaze direction. The extracting unit 52 may include a gaze direction extracting unit 52a for extracting a gaze direction of the detected face and a tilt information extracting unit 52b for extracting tilt information of the detected face.

The gaze direction extracting unit 52a extracts a gaze direction of the face detected in the face detecting unit 51. The gaze direction may be extracted using a well-known method related to gaze detection. For example, the gaze direction may be extracted through eye tracking. In the eye tracking, positions of eyes are searched for in an input image including the detected face, and then it is analyzed whether a gaze is in a particular direction by determining the shape around the eyes, the position of a pupil, or the position of reflected light in the input image for which the positions of the eyes are searched. The eye tracking is well-known method, and thus a detailed description thereof will be omitted here.

Figure 3:
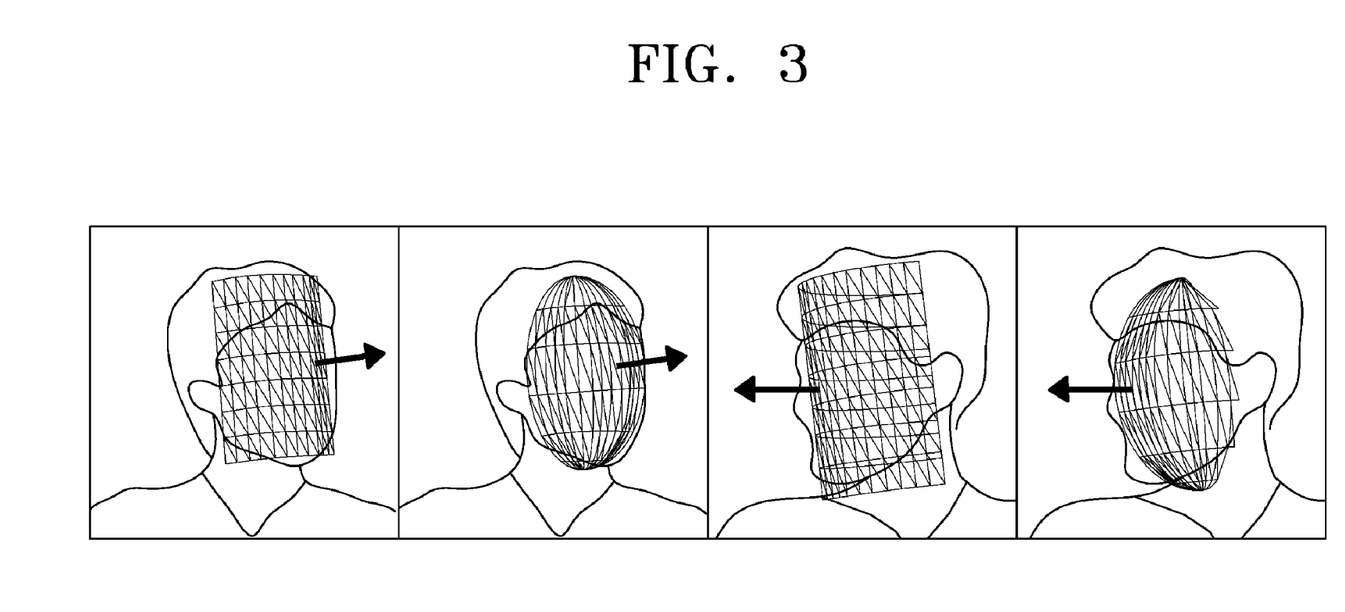
FIG. 3 is a pictorial diagram for describing a method of establishing a photographing composition by using a gaze direction, according to an embodiment of the invention.

Alternatively, the gaze direction may be extracted through head tracking. Referring to FIG. 3, let's assume that the face detected in the face detecting unit 51 is approximately shown as a cylinder surface or a spherical surface. Next, a normal vector component of the cylinder surface or spherical surface is detected by establishing a position corresponding to the eye or the middle of the forehead as a start point. As such, a direction in which the normal vector component faces may be a gaze direction. The head tracking may be performed when a person who is a subject closes his or her eyes or when it is difficult to find a pupil and thus is difficult to perform an eye tracking method. The head tracking is also a well-known method, and thus a detailed description thereof will be omitted here.

The extraction of the gaze direction using the above-mentioned method means extracting in which direction the detected face is facing. That is, the above-mentioned method may determine whether the gaze direction is toward the front or side by extracting the gaze direction of the subject included in the input image. For example, the above-mentioned method may determine whether a normal vector component corresponding to the gaze direction corresponds to which coordinate on a screen or the normal vector component corresponding to the gaze direction is included in which region of the screen.

The tilt information extracting unit 52b extracts information about the degree in which the face detected in the face detecting unit 51 is tilted horizontally. For example, as a result of the extraction of the gaze direction, when a face faces frontward, the tilt information extracting unit 52b extracts how much the face is tilted horizontally.

For example, tilt information may be obtained by detecting a tilt vector with respect to a face detected in the face detecting unit 51, and extracting a coordinate of the tilt vector with respect to a coordinate plane corresponding to the detected face or extracting a quadrant corresponding to a direction of the tilt vector. As another example, tilt information may be obtained by extracting an angle of the tilt vector.

Figure 4:
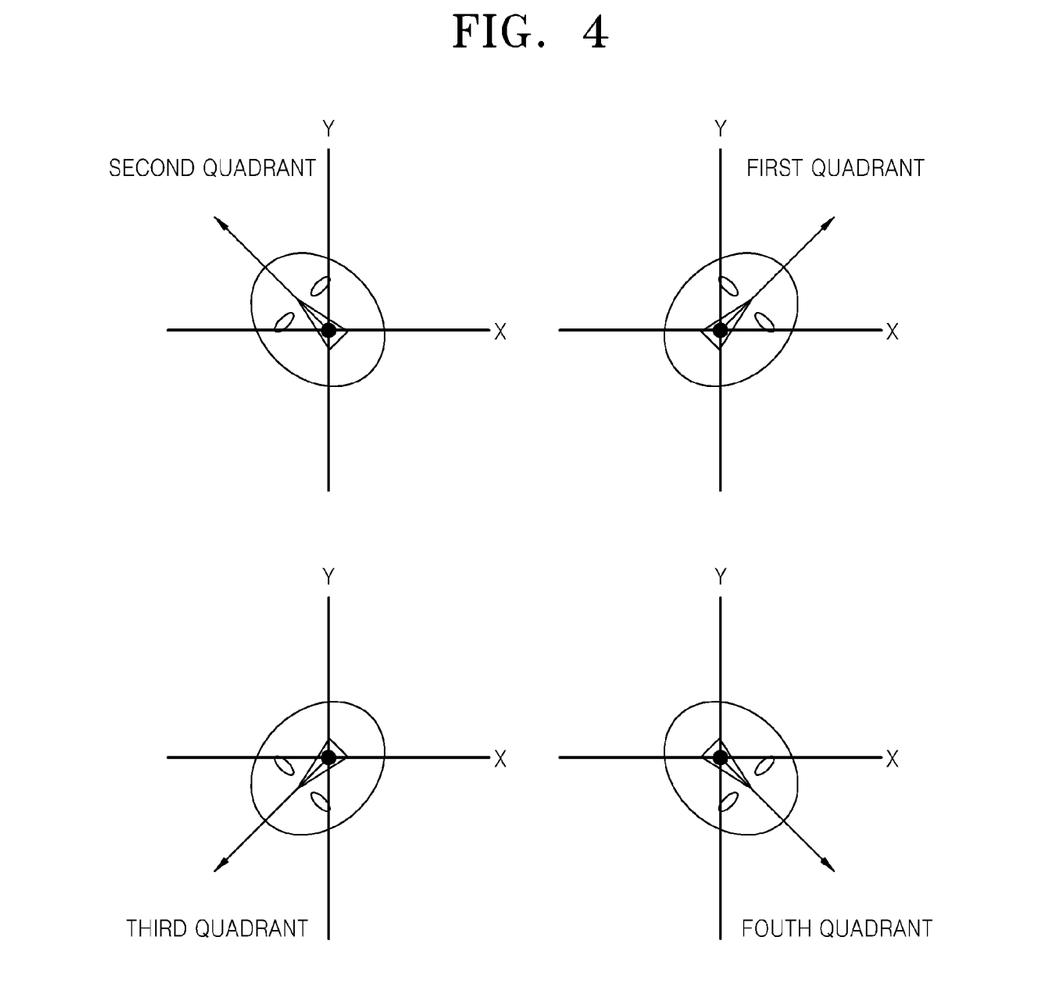
FIG. 4 is a pictorial diagram for describing a method of establishing a photographing composition by using tilt information, according to an embodiment of the invention.

In detail, referring to FIG. 4, the tilt vector is a vector extending in a direction of a forehead from a nose in the detected face. The tilt vector may be referred to as a vector extending in a direction of the forehead via a nose starting from the tip of the nose. Also, the coordinate plane corresponding to the detected face may be referred to as a two dimensional plane in which a horizontal direction of the screen is an X axis and a direction perpendicular to the X axis is a Y axis, starting from the tip of the nose of the detected face. Consequently, as illustrated in FIG. 4, from among first through fourth quadrants, one quadrant corresponding to a direction of the tilt vector on the coordinate plane may be extracted. As such, the tilt information according to an embodiment of the invention may be a quadrant of the coordinate plane corresponding to the direction of the tilt vector. However, the tilt information is not limited thereto, and any information about a tilt state of a face, such as a coordinate, an angle of the tilt vector, or the like, is possible.

The establishing unit 53 establishes a photographing composition using the gaze direction or the tilt information.

Figure 5:
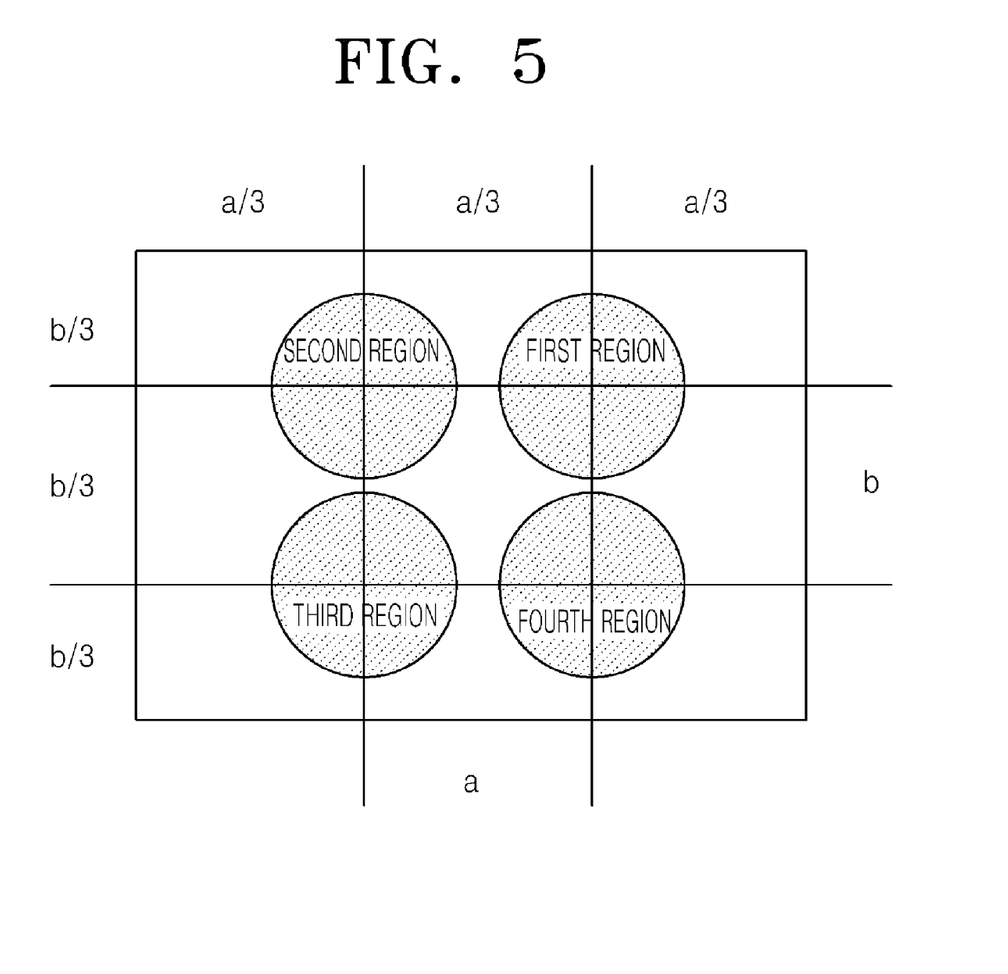
FIG. 5 is a pictorial diagram illustrating first through fourth regions divided according to a rule of thirds, when a photographing composition is established, according to an embodiment of the invention.

Referring to FIG. 5, first, a photographing composition established according to the current embodiment of the invention may be one region from among first through fourth regions that are obtained by dividing a screen according to a rule of thirds.

The rule of thirds is a rule in which a screen is divided into three equal parts in a horizontal direction and also divided into three equal parts in a vertical direction, thereby forming divided nine equal parts. Here, the screen includes four points in which horizontal lines and vertical lines cross each other. The four points may be referred to as first, second, third and fourth regions, as illustrated in FIG. 5. The first region includes a right upper part, in which the vertical and horizontal lines cross each other on the screen according to the rule of thirds, and a region adjacent to the left upper part. The second region includes a left upper part, in which the vertical and horizontal lines cross each other on the screen according to the rule of thirds, and a region adjacent to the right upper part. The third region includes a left lower part, in which the vertical and horizontal lines cross each other on the screen according to the rule of thirds, and a region adjacent to the left lower part. The fourth region includes a right lower part, in which the vertical and horizontal lines cross each other on the screen according to the rule of thirds, and a region adjacent to the right lower part.

In a photo of a person, when a subject is located in one region from among the first through fourth regions, an image having the most settled composition can be obtained, which may be understood as a golden ratio. When a photographing composition is determined in a photo or when a sketch composition is determined in a painting, the golden ratio may be used to obtain a balanced composition by drawing two lines on a screen in vertical and horizontal directions to divide a screen into nine sections and positioning a main subject on an intersection of the lines from among the four regions.

Hereinafter, a method of establishing a photographing composition by the establishing unit 53 will be described in detail, according to an embodiment of the invention.

Figure 6:
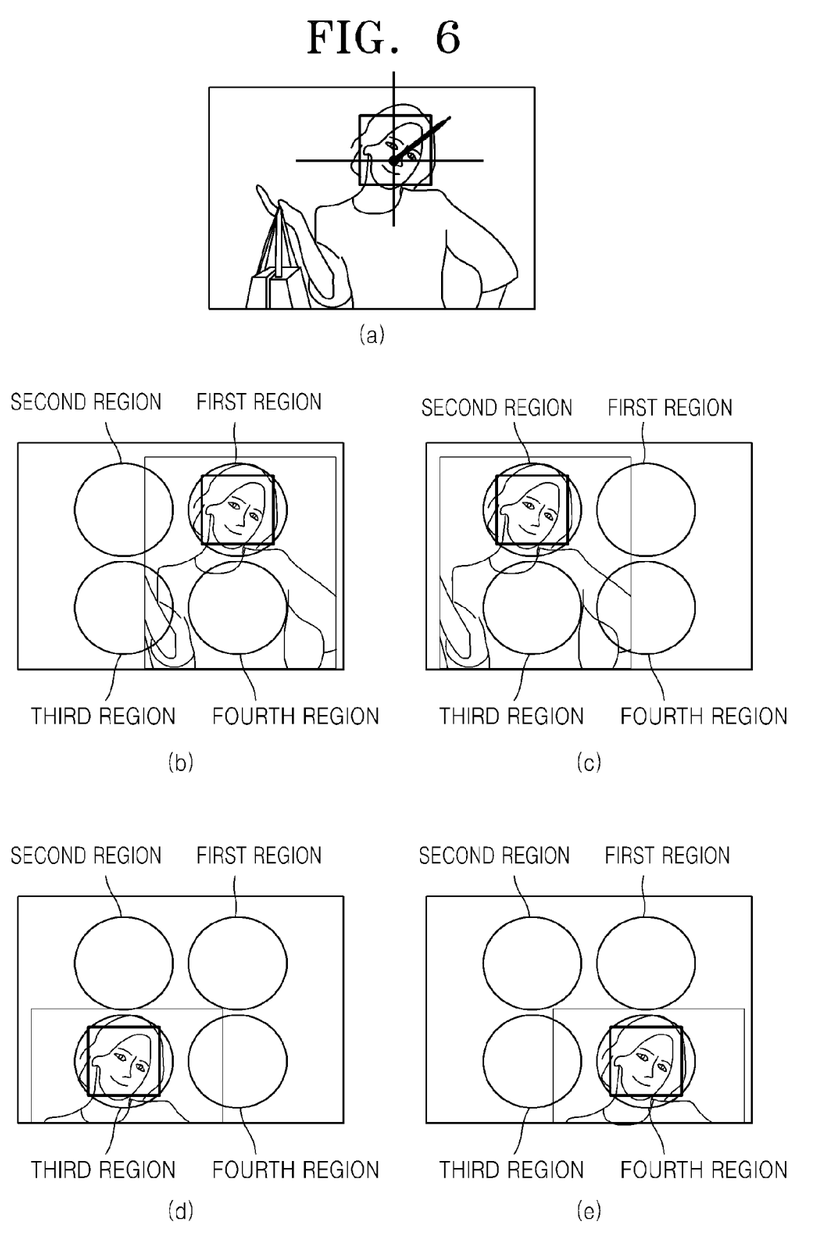
FIG. 6 is a pictorial diagram for describing a method of establishing a photographing composition, according to an embodiment of the invention.
Figure 7:
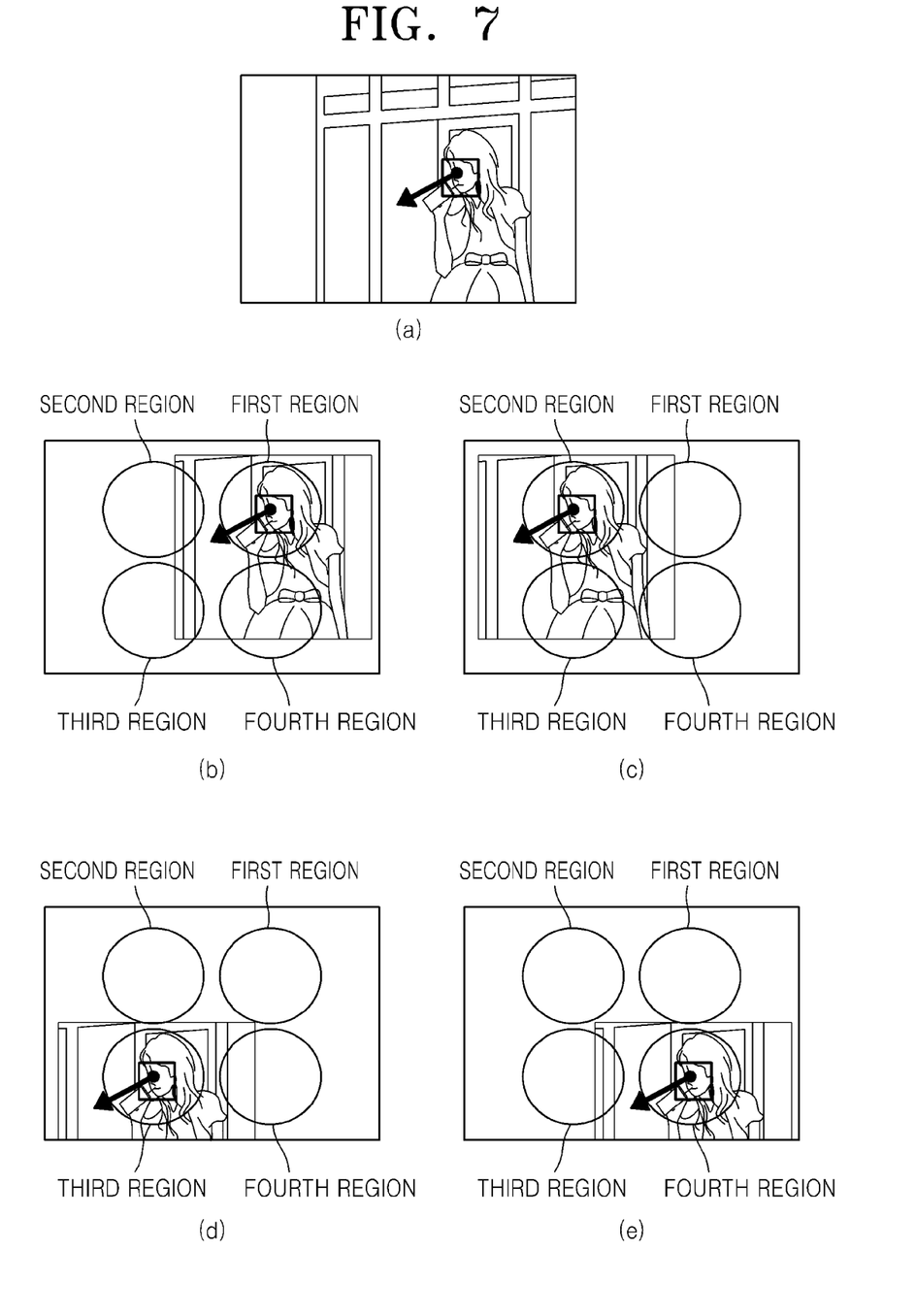
FIG. 7 is a pictorial diagram for describing a method of establishing a photographing composition, according to another embodiment of the invention.

FIGS. 6 and 7 are views for describing a method of establishing a photographing composition, according to an embodiment of the invention.

Referring to FIG. 6, as a result of extraction of the gaze direction with respect to the detected face performed by the gaze direction extracting unit 52a, when the gaze direction is frontward, a photographing composition may be established according to the tilt information.

The face detecting unit 51 detects a face with respect to an input image illustrated in (a) of FIG. 6. Next, the extracting unit 52 extracts a gaze direction and tilt information with respect to the detected face. In the embodiment shown in FIG.

6, the gaze direction is frontward. Since the gaze direction is frontward, in the establishing unit 53, a photographing composition is established according to the tilt information.

In an embodiment, the photographing composition of the first through fourth regions corresponding to the tilt information may be stored in the form of a table, algorithm or other data structure. As an example, as shown in Table 1, when a coordinate or direction of the tilt vector corresponds to a first quadrant of a coordinate plane, a photographing composition may be established so that the face is located in a first region on a screen. When the coordinate or direction of the tilt vector corresponds to a second quadrant, a photographing composition may be established so that the face is located in a second region of the screen. When the coordinate or direction of the tilt vector corresponds to a third quadrant, a photographing composition may be established so that the face is located in a third region of the screen. When the coordinate or direction of the tilt vector corresponds to a fourth quadrant, a photographing composition may be established so that the face is located in a fourth region of the screen.

TABLE 1

| Tilt Information | Matching Region |
| --- | --- |
| first quadrant | first region |
| second quadrant | second region |
| third quadrant | third region |
| fourth quadrant | fourth region |

In (a) of FIG. 6, as described with reference FIG. 5, as a result of determination of the tilt information extracted with respect to the detected face, since a direction of the tilt vector is a right upper direction, the tilt information corresponds to the first quadrant of the coordinate plane. Accordingly, from among the four regions divided according to the rule of thirds illustrated in (b) through (e) of FIG. 6, the detected face may be located in the first region, as illustrated in (b) of FIG. 6.

FIG. 7 is a view for describing a method of establishing a photographing composition, according to another embodiment of the invention.

Referring to FIG. 7, as a result of extraction of the gaze direction with respect to the detected face performed by the gaze direction extracting unit 52a, when the gaze direction is not frontward, a photographing composition may be established according to the gaze direction.

A face is detected in the face detecting unit 51 with respect to an input image, as illustrated in (a) of FIG. 7. Next, the extracting unit 52 extracts a gaze direction and tilt information with respect to the detected face. In the embodiment shown in FIG. 7, the gaze direction is not frontward. Since the gaze direction is not frontward in the establishing unit 53, a photographing composition may be established according to the gaze direction.

The establishing unit 53 establishes a photographing composition in which the detected face is located in one region from among first through fourth regions of a screen and a person is located in a region where a gaze direction is toward the center of the screen.

In (a) of FIG. 7, the detected face is not frontward and stares at a left lower portion of the screen. Accordingly, a photographing composition is established according to the gaze direction. In particular, from among the first through fourth regions divided according to the rule of thirds as illustrated in (b) through (e) of FIG. 7, one region where the gaze direction is toward the center of the screen is established. Consequently, as illustrated in (b) of FIG. 7, the detected face may be located in the first region.

With respect to the embodiments of the invention shown in FIG. 6 and FIG. 7, the photographing composition illustrated in (b) of FIG. 6 or (b) of FIG. 7 is established with respect to the input image illustrated in (a) of FIG. 6 or (a) of FIG. 7, so that a user can obtain a balanced photographing composition.

When the photographing composition established in the establishing unit 53 and the photographing composition currently shown on the screen of a display unit are different from each other, the providing unit 54 provides a change of a photographing composition according to the established photographing composition.

In an embodiment, a method of providing the change of the photographing composition includes displaying a screen region corresponding to the established photographing composition or outputting a warning in the form of a text or voice message, or other visual or sound indicator.

Figure 8:
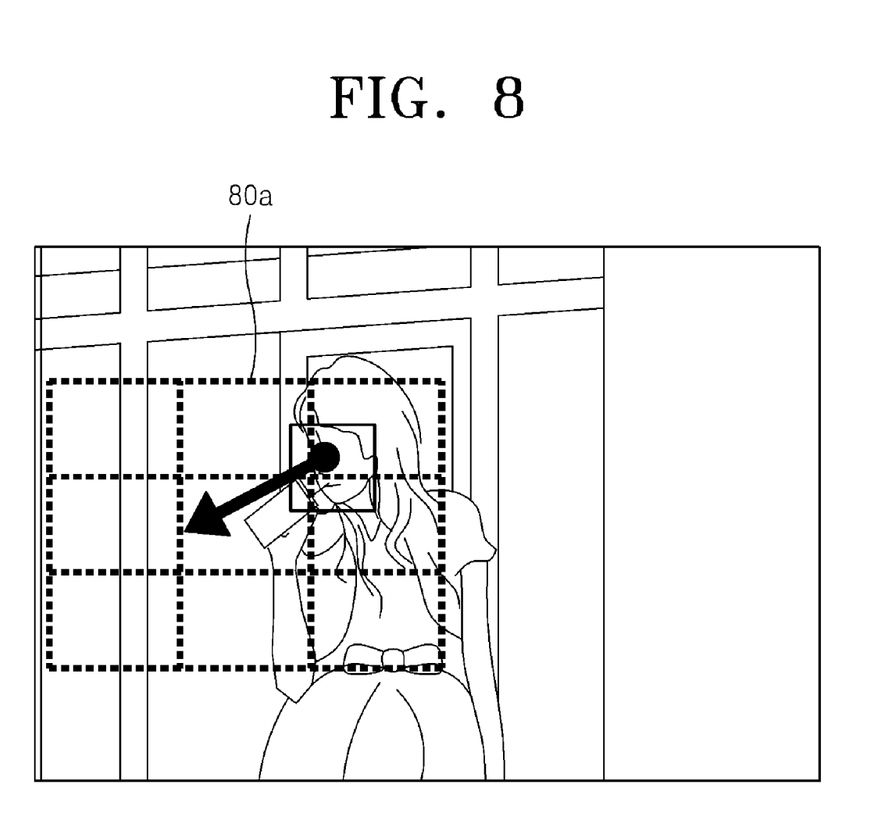
FIG. 8 is a pictorial diagram for describing a method of providing a photographing composition, according to an embodiment of the invention.

FIG. 8 is a pictorial diagram for illustrating a method of providing a change of a photographing method, according to an embodiment of the invention.

Referring to FIG. 8, a photographing composition is established with respect to an input image as described with reference to the embodiment of FIG. 7. A guide box 80a is displayed to provide the established photographing composition. The guide box 80a is a virtual screen region where a subject is located in correspondence to the established photographing composition. A user may establish a photographing composition by relocating the subject in accordance with the established photographing composition through the guide box 80a.

A method of providing the established photographing composition is not limited to the method illustrated in FIG. 8, and a change of the photographing composition may be provided in an embodiment by generating a warning in the form of a text or voice message.

The photographing composition is changed by user, and when the photographing composition is in accordance with the established photographing composition, an image may be captured by inputting a signal from a shutter button (not shown) or may be automatically captured after a predetermined period of time passes.

Figure 9:
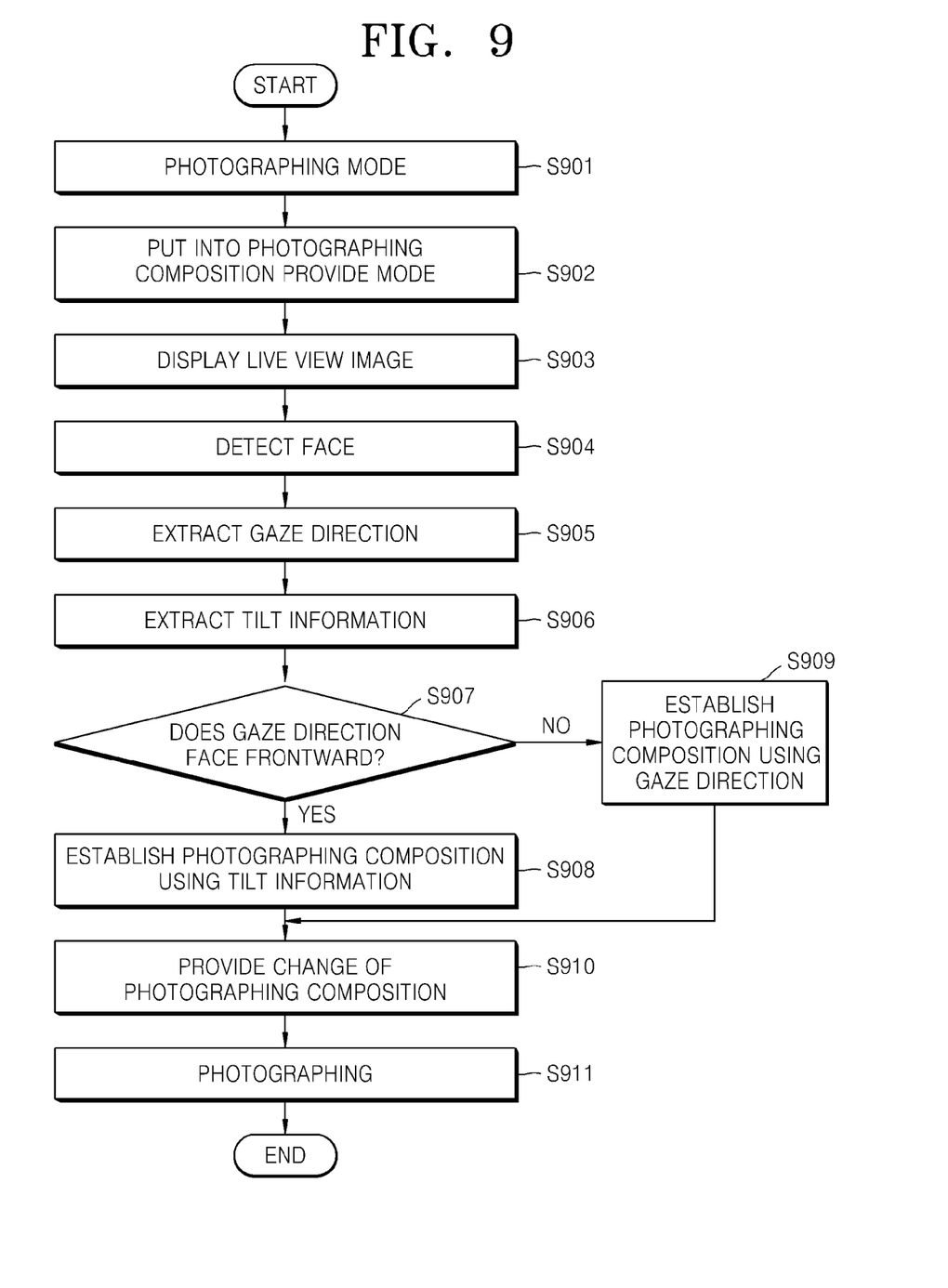
FIG. 9 is a flowchart illustrating a digital image capturing method, according to an embodiment of the invention.

FIG. 9 is a flowchart illustrating a digital image capturing method, according to an embodiment of the invention.

FIG. 9 illustrates a process for establishing and providing a photographing composition through a gaze direction and tilt information of a detected face. A main algorithm of the digital image capturing method may be performed inside the DSP 50 with the aid of peripheral components included in a digital image capturing device.

A DSP 50 having received a user's input signal in a photographing mode (S901) changes to a photographing composition provide mode (S902).

When the digital image capturing device is changed to the photographing composition provide mode, the DSP 50 displays a live view image on a display unit (S903). For example, an example of the live view image for providing a photographing composition is illustrated in (a) of FIG. 6 and (a) of FIG. 7.

When the live view image is displayed, the DSP 50 detects a face of the live view image (S904). That is, internally, the DSP 50 detects the face with respect to an image input to the DSP 50 via an image capture device. The DSP 50 detects a face of a subject included in the input image. A method of detecting the face has been described above, and thus a detailed description thereof will be omitted here. In the embodiment of FIG. 9, in a face detecting function, a square face detection region exists on a face of a subject, and the size of the face detection region increases or decreases depending on a distance between the subject and a lens.

After the face is detected, the DSP 50 extracts a gaze direction with respect to the detected face (S905). A method of extracting the gaze direction uses a gaze detection method. The gaze detection method has been described above, and thus a detailed description thereof will be omitted here. The extraction of the gaze direction using such a method means extracting in which direction the detected face is facing on the screen. That is, the method may determine whether the gaze direction is toward the image capturing device or to a side by extracting the gaze direction of the subject included in the input image. Alternatively, the face may be detected through a vector component corresponding to the gaze direction.

Next, the DSP 50 extracts tilt information with respect to the detected face (S906). The method of extracting the tilt information includes detecting a tilt vector with respect to the detected face and establishing a coordinate plane corresponding to the detected face. A quadrant corresponding to a direction of the tilt vector on the coordinate plane may be the tilt information. A method of providing the tilt information has been described above, and thus a detailed description thereof will be omitted here. Also, the tilt information is not limited thereto, and any information about a tilted state of a face is possible.

Either of the processes for extracting the gaze direction or the tilt information may be arbitrarily performed first.

The DSP 50 establishes a photographing composition using the gaze direction or tilt information. For example, first, it is determined whether the gaze direction is frontward or not (S907). When the gaze direction is frontward, the DSP 50 establishes the photographing composition using the tilt information, or when the gaze direction is not frontward, the DSP 50 establishes the photographing composition using the gaze direction.

First, a case where the photographing composition is established using the tilt information when the gaze direction is frontward will now be described (S908). In this case, the tilt information is a quadrant corresponding to a tilt vector. Photographing compositions of first through fourth regions of a screen divided according to the rule of thirds are arranged in the form of a table or algorithm. Accordingly, the photographing composition is established so that the face detected through the tilt information is located in one region from among the first through fourth regions. The tilt information and the arrangement of each region of the screen have been described above, and thus a detailed description thereof will be omitted here.

Second, a case where the photographing composition is established using the gaze direction when the gaze direction is not frontward will now be described (S909). In this case, a photographing composition is established so that the detected face is located in one region from among the first through fourth regions of the screen divided according to the rule of thirds, and also so that a person is located in a region where the gaze direction is toward the center of the screen. A method of locating the gaze direction toward the center of the screen has been described above, and thus a detailed description thereof will be omitted here.

Next, when the current photographing composition and the established photographing composition are different from each other, the DSP 50 provides the current photographing composition to be changed to the established photographing composition (S910). At this time, the DSP 50 provides a change of the photographing composition by displaying a guide box 80a on the screen or by generating a warning in the form of a text or voice message.

After the photographing composition is changed the DSP 50 captures an image including a subject (S911). When the photographing composition is changed to the established photographing composition, an image may be captured by inputting a signal from a shutter button (not shown) or may be automatically captured after a predetermined period of time passes.

Figure 10:
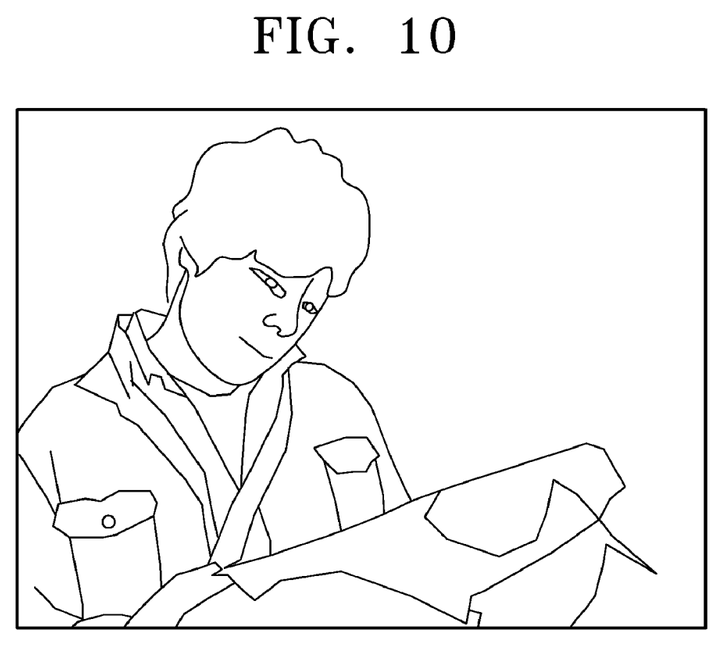
FIGS. 10 and 11 are images captured according to an established photographing composition, according to an embodiment of the invention.
Figure 11:
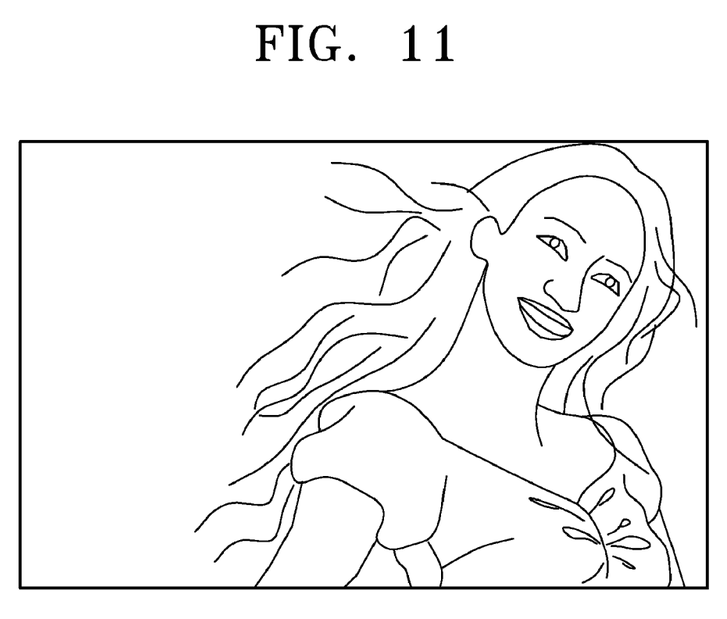

FIGS. 10 and 11 are images captured according to an established photographing composition, according to an embodiment of the invention.

FIG. 10 illustrates a case where a subject is a person and a gaze direction is not frontward. Thus, according to the invention, a photographing composition is established according to the gaze direction. From among first through fourth regions divided according to the rule of thirds, a region where the gaze direction is toward the center of a screen is a second region. Accordingly, a digital photographing device provides a face to be located in the second region, and an image is obtained according to the provided photographing composition, which is illustrated in FIG. 10.

FIG. 11 illustrates a case where a subject is a person and a gaze direction is frontward. Thus, according to the invention, a photographing composition is established according to tilt information of a face. That is, a tilt vector corresponding to the face is toward a right upper portion, which corresponds to a first quadrant of a coordinate plane. Accordingly, according to the tilt information, the face is located in a first region of a screen, and an image is obtained according to the provided photographing composition, which is illustrated in FIG. 11.

According to various embodiments of the invention, when a subject is a person, a settled image can be captured, and a balanced photographing composition can be achieved when using a digital photographing device. Accordingly, even if a user is not a professional photographer, a photographing composition based on the golden ratio, which is statistically used the most by professional photographers, is provided by a digital photographing device. A user may thus be able to use a composition for an image similar to those used by professional photographers.

Embodiments of the invention can be used in various image processing devices, for example, a digital camera, a mobile phone with a camera, a digital camcorder, etc.

According to an embodiment of the invention, after a face is detected when photographing a person, an optimized photographing composition is established in consideration of tilt information and a gaze direction, thereby providing an improved photographing environment to a user.

The invention can be also embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the invention can be easily construed by programmers of ordinary skill in the art to which the invention pertains.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital image capturing device including a screen on which an input image is displayed, the digital image capturing device comprising:
   a face detecting unit for detecting a face in the input image;
   an extracting unit for extracting tilt information of the detected face and a gaze direction;
   an establishing unit for establishing a photographing composition according to at least one of the tilt information and the gaze direction of the face; and a providing unit for providing a change of the photographing composition according to the established photographing composition.

2. The digital image capturing device of claim 1, wherein the extracting unit comprises:
a gaze direction extracting unit for extracting the gaze direction of the face, and
if the gaze direction of the face is frontward, a tilt information extracting unit for detecting a tilt vector based on the face and for extracting a coordinate of the tilt vector based on a coordinate plane corresponding to the face.

3. The digital image capturing device of claim 2, wherein the tilt information extracting unit detects the tilt vector extending from a nose to a forehead, and extracts a coordinate of the tilt vector based on a coordinate plane in which a horizontal direction of the screen is an X axis and a direction perpendicular to the X axis is a Y axis.

4. The digital image capturing device of claim 1, wherein when the gaze direction of the face is frontward, the establishing unit establishes a photographing composition according to the extracted tilt information.

5. The digital image capturing device of claim 3, wherein when the coordinate of the tilt vector corresponds to a first quadrant of the coordinate plane, the establishing unit establishes a photographing composition such that the face is located in a first region of the screen; when the coordinate of the tilt vector corresponds to a second quadrant of the coordinate plane, the establishing unit establishes a photographing composition such that the face is located in a second region of the screen; when the coordinate of the tilt vector corresponds to a third quadrant of the coordinate plane, the establishing unit establishes a photographing composition such that the face is located in a third region of the screen; and when the coordinate of the tilt vector corresponds to a fourth quadrant of the coordinate plane, the establishing unit establishes a photographing composition such that the face is located in a fourth region of the screen.

6. The digital image capturing device of claim 1, wherein when the gaze direction of the face is not frontward, the establishing unit establishes a photographing composition according to the extracted gaze direction.

7. The digital image capturing device of claim 5, wherein the establishing unit establishes a photographing composition such that the face is located in one region from among the first through fourth regions of the screen, and the one region is a region where the extracted gaze direction is toward the center of the screen.

8. The digital image capturing device of claim 1, wherein the establishing unit establishes the photographing composition such that the face is located in one region from among four regions divided according to a rule of thirds.

9. The digital image capturing device of claim 1, wherein the providing unit provides a change of the photographing composition by displaying a screen region corresponding to the established photographing composition.

10. A digital image capturing device comprising:
a face detecting unit that detects a face in an image;
an extracting unit that determines a gaze direction of the face and if the gaze direction is frontward, determines tilt information of the face;
an establishing unit that determines a photographing composition based on the tilt information of the face if the gaze direction is frontward and the gaze direction of the face if the gaze direction is not frontward; and
a providing unit that indicates where on a display of the digital image capturing device the face should be located based on the photographing composition.

11. A digital image capturing method comprising:
detecting a face in an input image;
extracting tilt information and a gaze direction of the detected face;
establishing a photographing composition according to at least one of the tilt information and the gaze direction of the face; and
providing a change of the photographing composition according to the established photographing composition.

12. The method of claim 11, wherein the extracting of the tilt information and the gaze direction comprises;
if the gaze direction of the face is frontward, extracting a tilt vector based on the face and extracting a coordinate of the tilt vector based on a coordinate plane corresponding to the face.

13. The method of claim 12, wherein the extracting of the tilt information and the gaze direction comprises;
detecting the tilt vector extending from a nose to a forehead, and
extracting a coordinate of the tilt vector based on a coordinate plane in which a horizontal direction of the screen is an X axis and a direction perpendicular to the X axis is a Y axis.

14. The method of claim 11, wherein the establishing of the photographing composition comprises, when the gaze direction of the face is frontward, establishing a photographing composition according to the extracted tilt information.

15. The method of claim 13, wherein the establishing of the photographing composition comprises:
when the coordinate of the tilt vector corresponds to a first quadrant of the coordinate plane, establishing a photographing composition such that the face is located in a first region of the screen;
when the coordinate of the tilt vector corresponds to a second quadrant of the coordinate plane, establishing a photographing composition such that the face is located in a second region of the screen;
when the coordinate of the tilt vector corresponds to a third quadrant of the coordinate plane, establishing a photographing composition such that the face is located in a third region of the screen; and
when the coordinate of the tilt vector corresponds to a fourth quadrant of the coordinate plane, establishing a photographing composition such that the face is located in a fourth region of the screen.

16. The method of claim 11, wherein the establishing of the photographing composition comprises, when the gaze direction of the face is not frontward, establishing a photographing composition according to the extracted gaze direction.

17. The method of claim 15, wherein the photographing composition is established such that the face is located in one region from among the first through fourth regions of the screen, and the one region is a region where the extracted gaze direction is toward the center of the screen.

18. The method of claim 11, wherein the photographing composition is established such that the face is located in one region from among four regions divided according to a rule of thirds.

19. The method of claim 15, wherein the photographing composition is established such that the face is located in one region from among the first through fourth regions divided according to a rule of thirds.

20. The method of claim 11, wherein the providing of the photographing composition comprises providing a change of the photographing composition by displaying a screen region corresponding to the established photographing composition.

* * * * *